UNITED STATES PATENT OFFICE.

WILLIAM KIRBY, OF LONDON, ENGLAND, ASSIGNOR TO SOUTH METROPOLITAN GAS COMPANY, OF LONDON, ENGLAND.

PURIFICATION OF CARBAZOLE.

1,348,722.  Specification of Letters Patent.  Patented Aug. 3, 1920.

No Drawing.  Application filed December 9, 1919. Serial No. 343,665.

*To all whom it may concern:*

Be it known that I, WILLIAM KIRBY, a subject of the King of Great Britain, residing in London, England, have invented a certain new and useful Improvement in the Purification of Carbazole, of which the following is a specification.

Carbazole is soluble in strong sulfuric acid and is precipitated from the solution by addition of sufficient water. This fact has been applied for the purification of crude carbazole; for the impurities remain in the solution when the acid is diluted to precipitate the carbazole. The precipitate, however, is in finely divided amorphous condition forming with the diluted acid a paste which can be manipulated with difficulty. Furthermore, the dilution of the acid generates heat rapidly, so that the temperature is liable to rise to that at which sulfonation of the carbazole occurs.

By this invention these difficulties are overcome by diluting the solution so slowly that the carbazole separates in well defined crystals which are easily filtered, and the rise of temperature is comparatively small.

Thus, when the solution is exposed to an atmosphere carrying aqueous vapor it is found that after a certain lapse of time, diminished, if desired, by agitation of the solution, so much water vapor has been absorbed that the carbazole separates, but in comparatively large crystals which can be filtered with ease as compared with the filtration of the aforesaid paste.

Or atmospheric air, or artificially moistened air or other suitable moist gas, may be blown through the solution in a strong acid until the crystallization is complete.

In either case the humidity of the atmospheric air or other gas may be controlled for producing the best result, that is to say for obtaining in the shortest time crystals which can be easily filtered.

Time may be further saved by diluting the acid solution rapidly to a degree short of that required for causing permanent precipitation of the carbazole, and then further diluting the acid as above described.

As an example, 1 lb. of crude carbazole was dissolved in 10 lbs. of concentrated sulfuric acid at ordinary temperature and the solution was continuously stirred in a pot in which it presented a surface of 200 sq. ins. to the atmosphere of normal humidity; in 24 hours about 94 per cent. of the carbazole separated in crystals which were easily washed.

Having thus described the nature of the said invention and the best means I know of carrying the same into practical effect, I claim:—

A process of purifying carbazole which consists in causing a solution of the crude carbazole in sulfuric acid to absorb water from an atmosphere until the carbazole has separated from the solution.

In testimony whereof I have signed my name to this specification.

WILLIAM KIRBY.